(No Model.)
J. H. HOGGATT.
NECK YOKE.
No. 347,604. Patented Aug. 17, 1886.
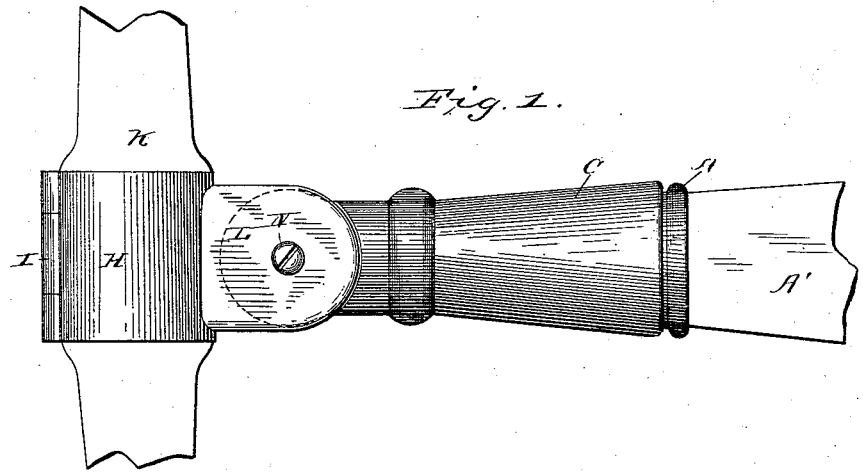
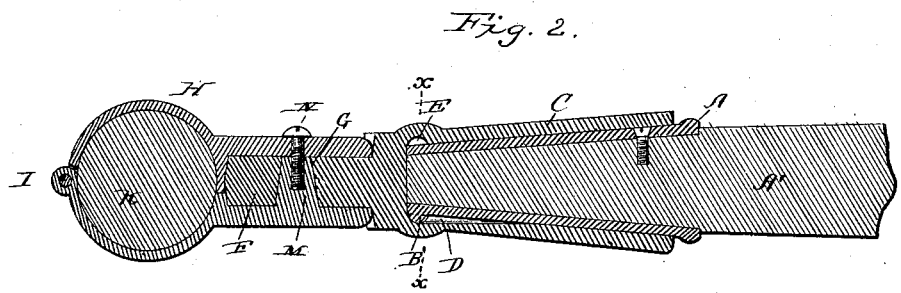
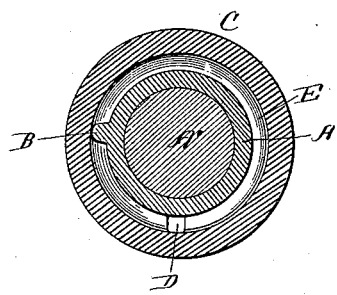
Witnesses
C. D. Davis
W. D. Alexander
Inventor
Jabesh H. Hoggatt
By his Attorney
C. M. Alexander

UNITED STATES PATENT OFFICE.

JABESH H. HOGGATT, OF LYNN, INDIANA.

NECK-YOKE.

SPECIFICATION forming part of Letters Patent No. 347,604, dated August 17, 1886.

Application filed July 7, 1886. Serial No. 207,343. (No model.)

*To all whom it may concern:*

Be it known that I, JABESH H. HOGGATT, a citizen of the United States, residing at Lynn, in the county of Randolph and State of Indiana, have invented certain new and useful Improvements in Neck-Yokes, of which the following is a specification, reference being had therein to the accompanying drawings.

This invention has for its objects to produce a neck-yoke which will be simple and durable in construction, and which will have a universal motion or a motion in various directions, as more fully hereinafter specified. These objects I attain by the means illustrated in the accompanying drawings, in which—

Figure 1 represents a top view of a neck-yoke constructed according to my invention; Fig. 2, a longitudinal sectional view of the same, and Fig. 3 a transverse sectional view taken on the line $x\,x$ of Fig. 2.

The letter A indicates a tapering sleeve, which is secured to the end of the pole A', and which has at its forward end a stud or projection, B.

C indicates a thimble, in which the sleeve is adapted to fit, the interior of said thimble near its forward end being provided with a longitudinal groove, D, and an annular groove, E, in the latter of which the stud or projection B sits when the parts are in place, so as to permit the thimble to turn freely upon the sleeve without pulling off of the same, the stud being passed into the annular groove when the parts are in proper position, through the longitudinal groove before mentioned. The forward end of the thimble terminates in a flat disk, F, which has a tapering central aperture, G.

The letter H indicates a divided collar, the parts of which are hinged together at I so as to open and close upon the yoke-bar K. The said collar at one side is provided with lugs or ears L, which embrace the flat disk F before mentioned, and form a socket for the same. Upon one of the lugs is formed a conical projection, M, which enters the tapering aperture in the said disk, and forms a pivot upon which the parts turn. The other lug, opposite the end of said projection, is provided with an aperture through which a screw, N, passes, the projection being screw-threaded for the reception of the screw, by which the parts are held securely together. As thus constructed, it will be perceived that the parts will move freely in various directions, and the device will be strong and durable, as none of the connecting parts are exposed so as to be injured by the weather or otherwise.

Having thus described my invention, what I claim, and desire to secure by Letters Patent, is—

1. The combination, with the thimble having a disk provided with a central tapering aperture, of the divided hinged collar having lugs or ears at one side, one of said lugs being provided with a tapering projection sitting in the tapering aperture in the disk, and the other with an aperture through which a screw passes into the threaded recess in the said projection, whereby the parts are held together, substantially as specified.

2. The combination, with the sleeve secured to the draft-pole, and having a lug at its forward end, of the thimble having a longitudinal and an annular groove, and adapted to fit and turn upon the sleeve, substantially as specified.

In testimony whereof I affix my signature in presence of two witnesses.

JABESH H. HOGGATT.

Witnesses:
W. R. HALLIDAY,
W. M. HALLIDAY.